Jan. 18, 1966　　　W. A. FARRAND　　　3,230,523
POSITION ENCODER

Filed April 2, 1963　　　　　　　　　　6 Sheets-Sheet 1

INVENTOR.
WILLIAM A. FARRAND
BY
ATTORNEY

Jan. 18, 1966     W. A. FARRAND     3,230,523
POSITION ENCODER

Filed April 2, 1963     6 Sheets-Sheet 2

INVENTOR.
WILLIAM A. FARRAND

BY

ATTORNEY

Jan. 18, 1966 W. A. FARRAND 3,230,523
POSITION ENCODER
Filed April 2, 1963 6 Sheets-Sheet 4

INVENTOR.
WILLIAM A. FARRAND
BY
ATTORNEY

Jan. 18, 1966   W. A. FARRAND   3,230,523
POSITION ENCODER

Filed April 2, 1963   6 Sheets-Sheet 5

INVENTOR.
WILLIAM A. FARRAND
BY
ATTORNEY

INVENTOR.
WILLIAM A. FARRAND

United States Patent Office

3,230,523
Patented Jan. 18, 1966

3,230,523
POSITION ENCODER
William A. Farrand, Fullerton, Calif., assignor to
North American Aviation, Inc.
Filed Apr. 2, 1963, Ser. No. 269,973
13 Claims. (Cl. 340—347)

This invention relates to apparatus for sensing and encoding position, and more particularly to a position encoding apparatus of increased reliability and higher resolution.

In order for a digital computer or other digital system to accept an analog input representative of a shaft position, an analog to digital converter is used which encodes shaft position to a number. An encoder commonly used is a commutating type device with a plurality of channels, one channel for each digit of the binary number representing shaft position, each channel having a plurality of segments, their relative lengths and positions being selected to correspond to the binary digits in the binary numbers representing all positions of one shaft revolution.

The advantage of such a coded-segment encoder is that for each shaft position, a definite digital representation is produced that is a whole value number. However, most whole-value shaft position encoders produce an ambiguous digital output from each channel as the associated position sensing elements pass from one segment to another with the result that accuracy is often undeterminable. The error produced by an ambiguous digital output from a given channel is referred to as a segment boundary error or carry ambiguity and is most troublesome with a pure binary code because for many successive numbers, two or more digits change value at the same time.

Carry ambiguities may be suppressed by manufacturing the coded-segment disc and sensors with precise tolerances, particularly if the encoder disc is of large diameter, but that is not only expensive but unsatisfactory for many applications that require miniature components. Another method of suppressing carry ambiguities is to use a code which changes in only one bit position from one number to the next higher or lower one, but such a code is not satisfactory for many applications because of the difficulty of providing apparatus for arithmetic operations in the digital system receiving the encoder output or the expense of providing apparatus for converting to the pure binary codes to avoid the necessity of providing special apparatus for arithmetic operations.

Other methods of suppressing carry ambiguities are the double-sensing method and the V-scan method. In the double-sensing method, two sets of sensors are provided for all of the channels except the least significant channel. One set of sensors is placed ahead and the other set of sensors behind the sensor for the least significant channel by an equal distance, the total distance between the two sets of sensors being equal to the length of a segment on the least significant channel. The digit sensed in the least significant channel is employed to select one set of sensors or the other, thereby eliminating any possibility of a carry ambiguity except in the least significant channel.

The V-scan method is similar in principle to the double sensing method but is distinguished by the fact that the sensors in each channel of successively higher significance are placed further apart and the particular sensor selected for reading-out in each channel depends upon the digit read out of the channel of next lower order of significance. This method takes advantage of a characteristic of the binary number system that if a digit is zero in a given order, the next most significant digit will not change if the digit in the given order is incremented by one, and that if a digit is one in the given order, the next most significant digit will not change if the digit in the given order is decremented by one. The double-sensing method takes advantage of the same fact, but only examines the least significant digit.

The regions of uncertainty in converting position to a binary coded number are eliminated by both the double-sensing method and the V-scan method to increase the resolution of the system, except in the least significant channel. Accordingly, the uncertainty or error is ±½ the value of the least significant binary digit. For example, in a six channel converter, $2^6$ or 64 positions may be resolved with an accuracy of one part in $2^7$ or 128. In order to increase resolution, more channels must be added. For instance, to increase resolution to one part in $2^{14}$ or 16,384 using either method of suppressing carry ambiguity, 13 channels must be provided. For many applications, such as in airborne or space vehicles, an increase in size to provide more channels may not be possible.

Coded-segment discs for angular position encoders have been produced with many different transducers, such as brushes with conductive segments, photocells with translucent segments and pole windings on a stator with variable reluctance paths through coded segments on a rotor. The latter is but one form of inductive sensing, but is preferred due to the higher resolution possible.

A multiple pole, variable reluctance miniature transducer of high resolution and increased precision has been described in a U.S. Patent application, Ser. No. 221,165, filed by the present inventor on Sept. 4, 1962, and assigned to the assignee of the present invention. It comprises two contoured ferrite discs, one for the rotor and one for the stator. The contour of the rotor provides on one face an annular channel or ring of regularly spaced radial binary segments. A first pair of poles is contoured in the face of the stator. When the faces of the two discs are placed opposite each other, a furcated continuous magnetic flux path is provided having a pair of branches through the pair of poles and a common portion through a center pole on each, the center pole of the stator having an excitation coil wound around it, and one of the poles of the pair being displaced 180° out of phase with the other relative to radial binary segments.

The magnetic gaps between the stator poles and the radial binary segments vary as the rotor is rotated relative to the stator, thereby varying the reluctance therebetween in accordance with the relative rotation. The stator poles are provided with sensing coils which are so wound and series connected as to provide two secondary windings in series opposition. Induced signals are thereby combined to provide a differential output signal. The stator poles are purposely made longer than the rotor segments, but with teeth and slots which match the rotor segments in order to sense more flux and to obtain an average from a number of pole teeth.

A second pair of poles similar to the first pair may be provided on the stator, but 90° out of phase with the first pair relative to the rotor teeth, in order to provide the ability to sense direction of rotation when necessary. That is accomplished by external logic circuits which effectively compare the phase of the signal from one pair with the phase of the signal from another pair. The result is a variable reluctance resolver of high resolution and increased precision with direction sensing.

A similar miniature variable reluctance transducer may be provided for a position encoder of a coded-segment type with the advantages of high resolution and increased precision by providing a plurality of binary coded channels, each associated with at least one pair of stator poles. For suppression of carry ambiguity, a second pair of stator poles may be provided for each channel except the least significant channel according to the double-sensing method or the V-scan method with external logic circuits.

An object of this invention is to reduce the quantum of uncertainty in the position code derived from the least significant channel of a coded-segment type position encoder.

Another object is to increase the resolution of each channel of coded-segment type position encoder and suppress carry ambiguities.

Another object is to provide an improved method of suppressing any ambiguity in a coded-segment type of position encoder.

Another object of this invention is to provide a miniature position encoding apparatus of increased reliability and higher resolution.

Still another object is to greatly improve the resolution of a coded-segment type of position encoder without increasing the number of channels or otherwise increasing the size of the coded-segment pattern.

A further object is to increase the resolution of a coded-segment type position encoder to $\pm\frac{1}{2}$ of one part in $2^{2n+1}$, where $n$ is an integer equal to the number of coded channels of the encoder.

These and other objects of the invention are achieved in a position encoder of the coded-segment type utilizing variable reluctance sensing techniques by binary coding a selected number $n$ of channels in the rotor of a magnetic resolver and providing four pairs of sensing poles on the stator for each channel, each pair of which provides a furcated continuous magnetic flux path with a center pole. The magnetic reluctance of a given pair of poles is varied in accordance with the position of the rotor relative to the stator while the reluctance of the center pole remains constant. The flux path of the center pole is magnetically excited by an alternating current through an exciting coil to magnetically excite the given pair of poles. Flux variation in the separate poles of a pair is sensed by a pair of oppositely wound, series connected coils. The sensing poles of a given pair are placed on the stator 180° out of phase relative to the coded segments of the channel with which they are associated. Since the two sensing coils of the given pair of poles are wound oppositely and connected in series, the induced signals subtract from one another to provide an output signal of increased sensitivity. The remaining three pair of poles associated with a given channel are similarly placed on the stator but so disposed relative to the first pair that the four separate signals derived from the four pair of sensing poles are 45° out of phase with each other. The four signals associated with the least significant channel are examined to discern eight discrete positions for a rotation of the rotor through an arc which produces one cycle of a given one of the four associated signals. The eight positions are represented by an octal code of three binary digits which constitute the three least significant digits of the position encoder. In that manner, the quantum of uncertainty in the position code derived from the least significant channel is reduced by a factor of eight and all carry ambiguity is suppressed except for the least significant digit of the octal code the unit value of which has been greatly reduced by increasing the number of orders in the output number to provide a higher resolution. The four signals associated with the remaining channels are examined in pairs, the signals of a given pair being selected to be 90° out of phase such that the two pairs are in turn 90° out of phase. Such a quadrature relationship of the signals from the four pair of poles of a given channel provide two separate quaternary codes of position, one quaternary code representing a position leading and the other representing a position lagging the position represented by the most significant digit of the position code derived from the next lower channel by 45°. The two quaternary codes are referred to collectively as a bi-quaternary code, but it is to be understood that only one quaternary code is selected at any given time to provide two binary digits representing position, depending upon whether the most significant binary digit of the next channel of lower significance is a 1 or a 0. In that manner, an octal code is combined with selected quaternary codes to provide a number having $2n+1$ binary digits from $n$ binary coded channels. The selection of the quaternary codes is made in such a manner as to suppress all ambiguity in each bi-quaternary coded channel.

It should be understood that although the preferred embodiment described is for converting angular position to a binary number, the invention may be adapted for converting linear position to a binary number either by transforming linear to angular motion by racks and pinions, or other linkages and gears, or by a direct adaptation of the broadest aspects of this invention with a lineal arrangement of the coded-segment channels.

Other objects and advantages of the invention will become apparent from the following description with reference to the following drawings in which.

Figure 1:
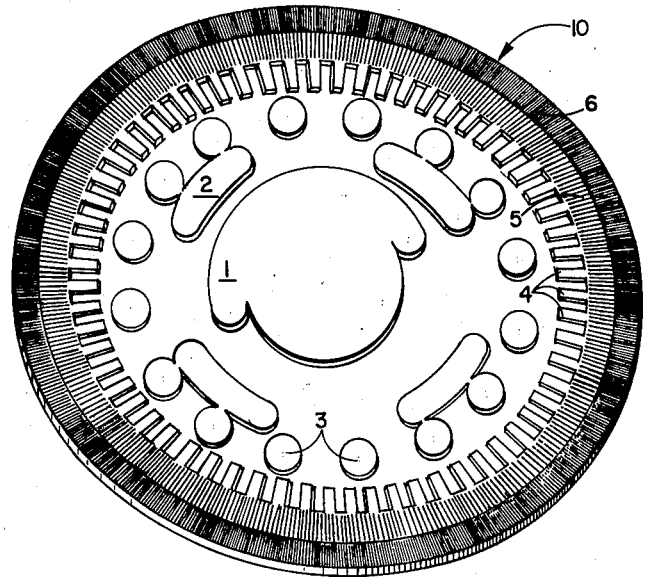
FIG. 1 is a perspective of a rotor having six channels of binary coded segments.
Figure 2:
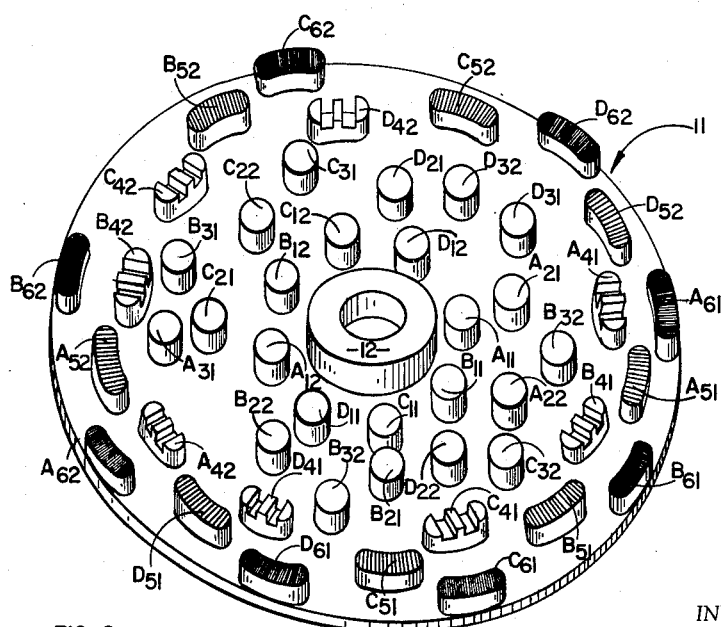
FIG. 2 is a perspective of a stator having twenty-four pairs of poles, four pairs for each of six channels of binary coded segments on the rotor of FIG. 1.
Figure 5:
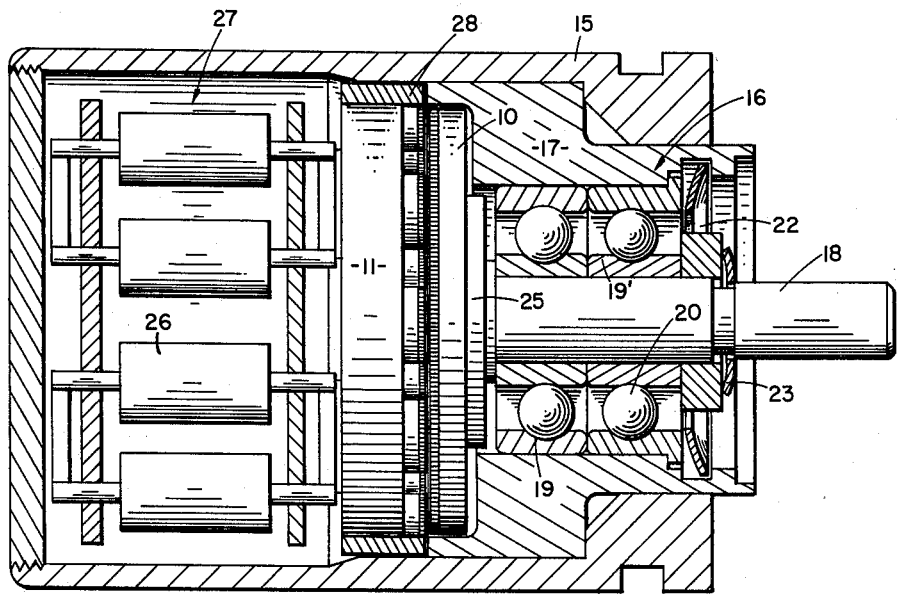
FIG. 5 illustrates an assembly of a preferred embodiment of this invention.

In a preferred embodiment of the invention shown in the drawings, a coded segment shaft position encoder is provided with variable reluctance type of inductive sensing. Accordingly, two disc members 10 and 11 are provided as shown in FIGS. 1 and 2, and assembled as shown in FIG. 5 in such a manner that the member 10, hereinafter referred to as the rotor, is rotatable about its center relative to the concentric member 11, hereinafter referred to as the stator. Both the rotor and stator may be made of machinable magnetic material such as a low-loss ferrite material.

Figure 3:
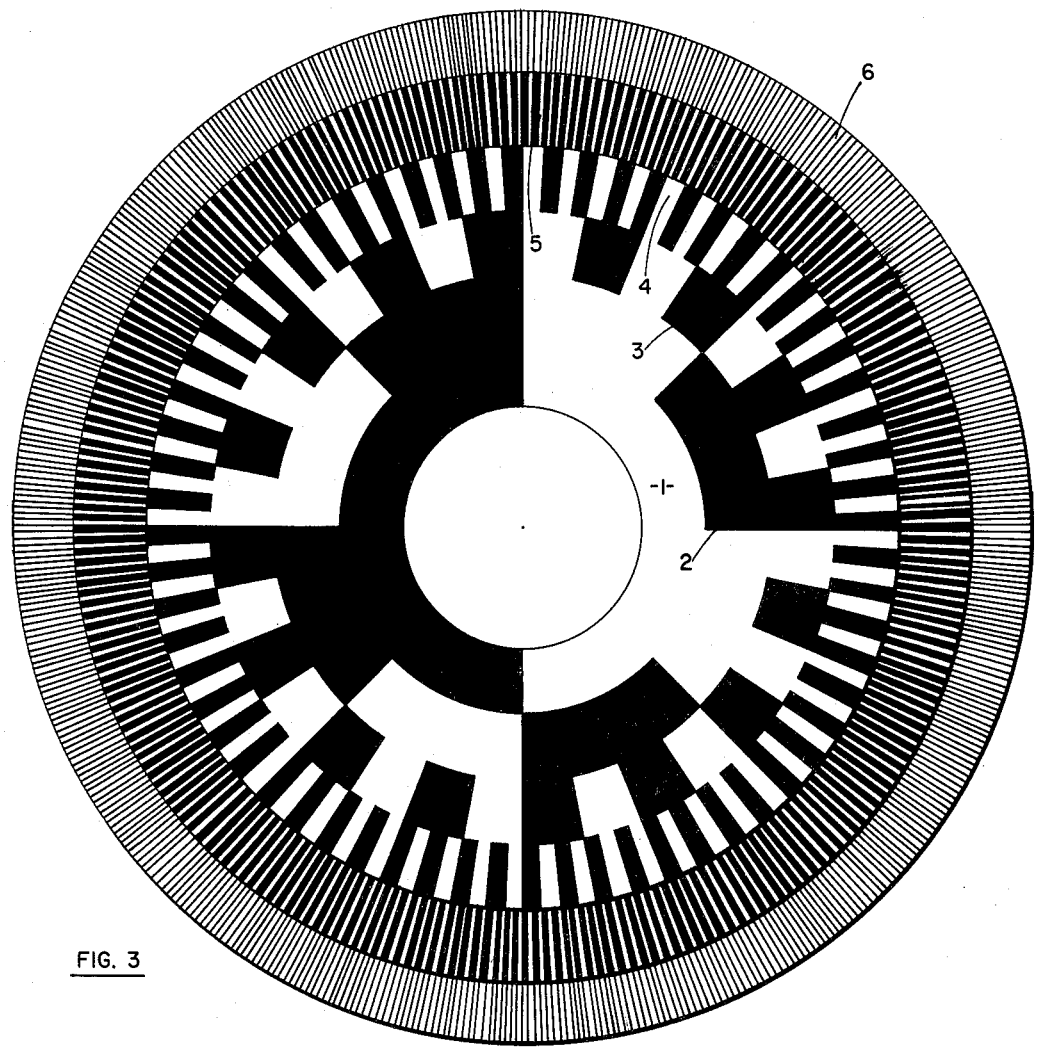
FIG. 3 is a code pattern employed in the coded-segment rotor of FIG. 1.

The ferrite rotor 10, which may be in the order of approximately 1⅛ inches in diameter, has six full channels of coded segments machined to a depth of approximately .015 inch, preferably with an ultrasonic machine tool. The first channel 1 counting from the center is divided into two sectors, one of which is machined out. Each sector of the first channel is divided into four sectors in the second channel 2, two of which are machined out as shown. Similarly, each sector of the second and successive channels is divided in the next succeeding channel into four sectors. The pattern employed is more clearly illustrated in FIG. 3. The most significant channel 1 is placed on the inside and has one raised segment. Channels 2, 3, 4, 5 and 6 have 4, 16, 64, 256 and 1,024 raised segments, respectively.

Although only six channels are provided in the embodiment illustrated. it should be understood that additional channels may be provided for greater resolution. However, as will be more fully appreciated as the description progresses, the present invention provides a resolution equivalent to 13 channels of the prior art type of position encoders since a 13-bit number is ultimately derived from the six channels provided, three bits from the least significant channel on the outside and two bits from each of the other five channels. Stated in general terms, a coded number of $2n+1$ bits with carry ambiguity suppression is derived from $n$ channels.

The ferrite stator 11 has four pickup pole pairs for each channel of the rotor 10 and a common exciting pole 12. The poles of a given channel are radially spaced the same distance from the center as the coded segments of the corresponding channel so that when the machined face of the rotor is placed opposite the pole face of the stator 11 in the manner illustrated in FIG. 5, six channels of pole face gaps are provided.

Figure 8:
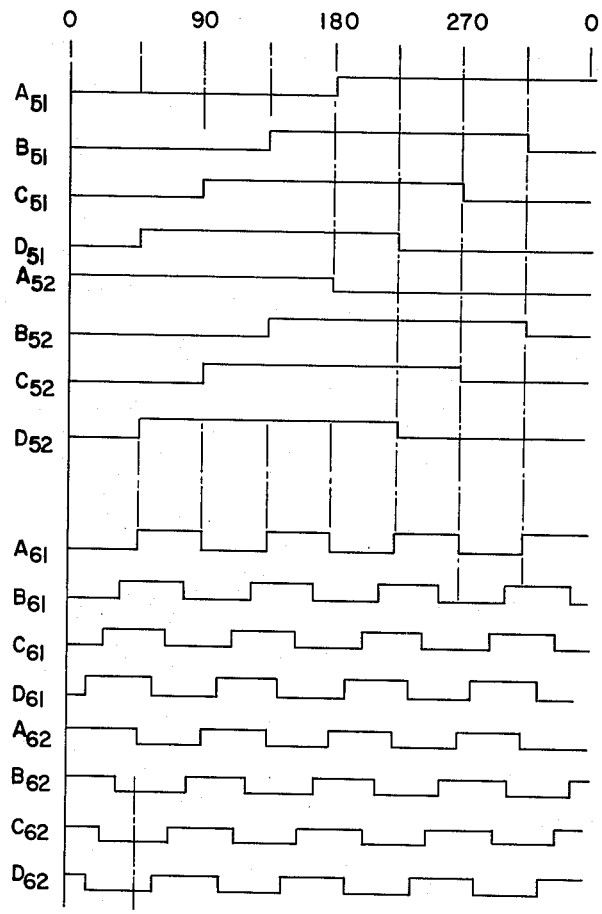
FIG. 8 is a waveform diagram for the two least significant channels of the assembly of FIG. 5.

The pole pairs of a given channel are designated $A_{i1}$, $A_{i2}$, $B_{i1}$, $B_{i2}$, $C_{i1}$, $C_{i2}$ and $D_{i1}$, $D_{i2}$ where the subscript $i$ denotes the channel. The poles of each pair are so placed as to be 180 degrees out of phase with each other relative to the coded segments of their associated channel on the rotor in a manner more fully described with reference to FIGS. 4 and 6, and wound oppositely with series-connected coils to provide a differential of the variable reluctance flux paths in accordance with the invention of the aforesaid copending application. The four pairs of poles of a given channel are so placed that their produced wave forms are 45 degrees out of phase with each other in a manner to be more clearly described with reference to FIGS. 6 and 8.

FIG. 5 illustrates a preferred embodiment of a miniature shaft position encoder which includes a housing 15 containing a rotor assembly 16 mounted within a sleeve 17. A shaft 18, adapted to be attached coaxially to a member whose angular position is to be indicated, is connected to the rotor 10. It is understood that the housing 15 is to be affixed to a stationary support.

The shaft 18 is journalled to the sleeve 17 by means of inner and outer bearing sleeves 19 and 19′ affixed to the shaft 18 and sleeve 17, respectively, together with ball bearings 20. Resilient annular retaining rings 22 and 23 are provided.

The rotor 10 is centered on the end of the shaft 18 and affixed to a ring 25 press fitted on the end of the shaft 18. In that manner the rotor 10 is reenforced and attached to the shaft. The rotor may be affixed to the ring with an epoxy resin and further secured with pins or screws if desired.

Figure 9:
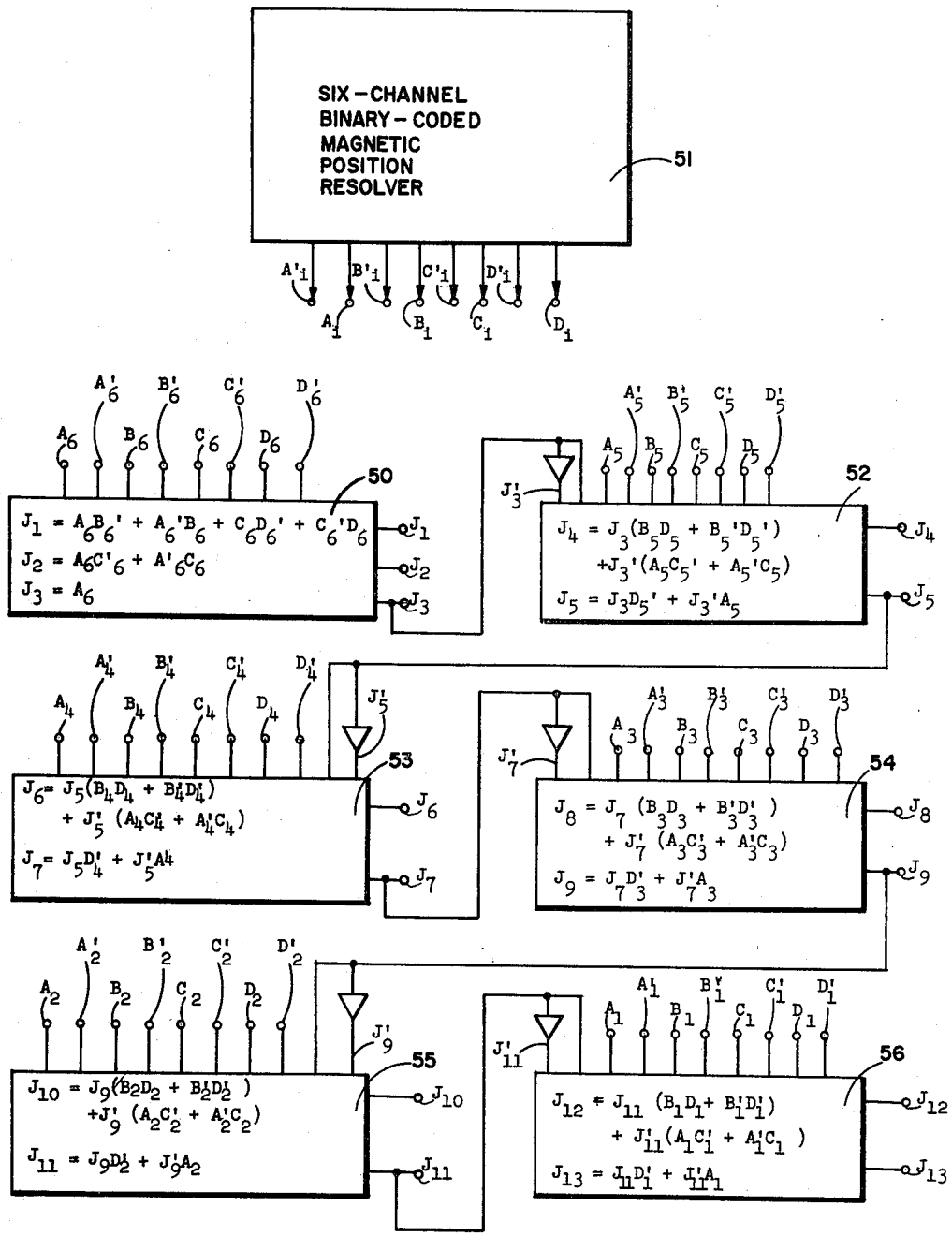
FIG. 9 is a schematic of logical networks for deriving a $2n+1$ bit number from a coded-segment type position encoder of the present invention having $n$ channels.

The logic networks of FIG. 9 may be included in the housing and are represented as comprising integrated semiconductor circuit packages such as the package 26 supported in a compartment 27, and interconnected as required by leads not shown. The appropriate leads to coils around poles of the stator 11 are passed through the hole in the center of the exciting pole 12 shown in FIG. 2. A bushing 28 is employed to fixedly secure the stator 11 to the housing 15.

Figure 6:
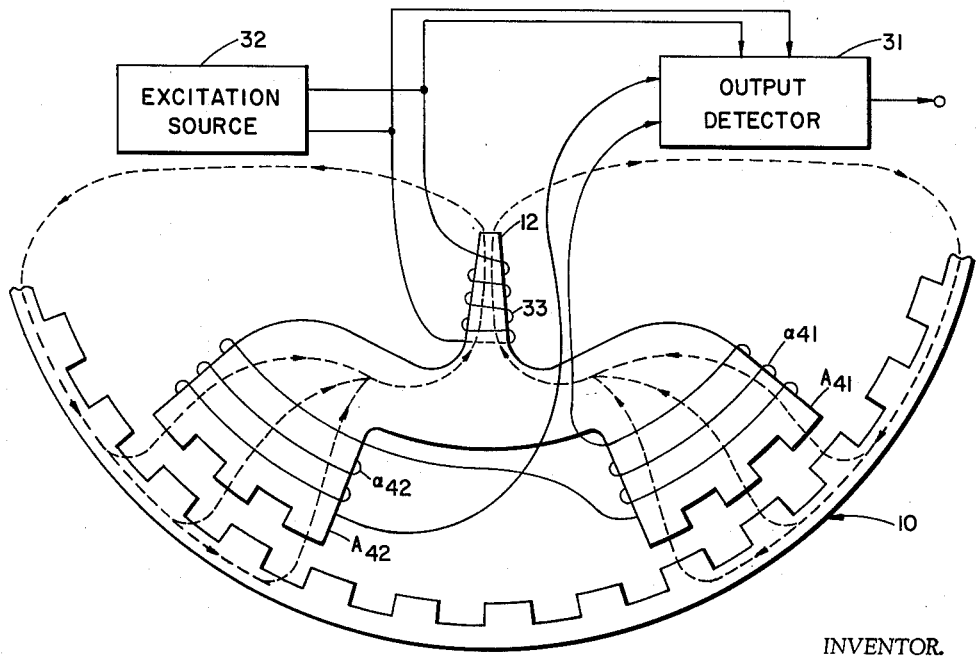
FIG. 6 is a schematic illustrating certain principles relating to variable reluctance sensing employed in the preferred embodiment of this invention.

Referring now to FIG. 6, a functional schematic of a pair of poles $A_{41}$ and $A_{42}$ of the four channel in the stator 11 (FIG. 2) is shown to illustrate the manner in which the pole of pair are placed 180 degrees out of phase with each other relative to coded segments in an associated channel of the rotor 10, and to illustrate the manner in which oppositely wound coils $a_{41}$ and $a_{42}$ are connected in series to an associated output detector 31. An excitation source 32 is connected to a coil 33 wound around the exciting pole 12 and to the output detector 31.

The poles $A_{41}$ and $A_{42}$ are each provided with a number of teeth having a width and mutual spacing identical to the width and spacing of the coded segments in the fourth channel of the rotor 10 (FIG. 1). The poles comprise branches of a closed magnetic flux path through the rotor 10 and the exciting pole 12. The magnetic gap between the stator poles $A_{41}$ and $A_{42}$, and the associated coded segments of the stator 10, provide variable reluctances in the respective magnetic flux paths to provided induced signals in coils $A_{41}$ and $A_{42}$ which are 180 degrees out of phase. It should be understood that the proportions shown are for illustration purposes only; in practice the gaps should be made as small as possible.

During a given half cycle of an A.C. signal from the excitation source 32, magnetic flux flows through the closed flux paths in the directions indicated by the arrows. The flux flowing through all of the teeth of a given pole is sensed by the associated coil to provide from the pair of coils out of phase signals which are combined to provide a differential signal to the output detector 31. If the teeth of the pole $A_{41}$ are exactly aligned with the coded segments of the rotor 10, the reluctance of the magnetic gaps between the pole $A_{41}$ and the coded segments of the rotor 10 is relatively low, in which case the teeth of the other pole $A_{42}$ are aligned with spaces between the coded segments of the rotor 10 to provide magnetic gaps of relatively high reluctance. Thus the magnetic flux flowing through the pole $A_{41}$ is at a maximum while the magnetic flux flowing through the pole $A_{42}$ is at a minimum. Under those circumstances the signals induced in the coils $a_{41}$ and $a_{42}$ are differentially combined to provide a more distinct signal representing position relative to the coded segments. A similar analysis may be made for different positions of the rotor 10 with respect to the pole pair $A_{41}$ and $A_{42}$.

Figure 4:
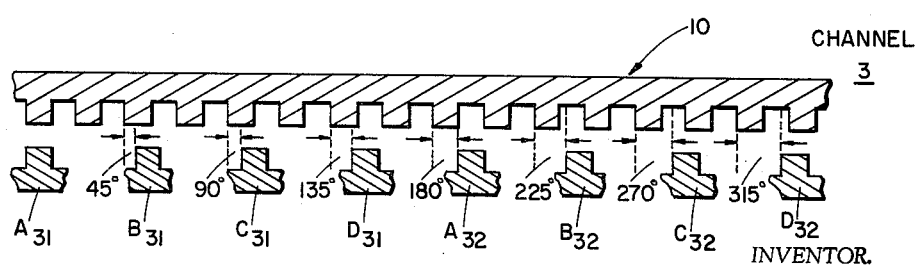
FIG. 4 illustrates schematically the manner in which poles on the stator of FIG. 2 are associated with one channel of coded segments on the rotor of FIG. 1 such that four pole pairs are provided spaced 45° from each other relative to the coded segments.

FIG. 4 schematically illustrates the manner in which the poles of channel 3 are positioned with respect to the coded segments to provide four pair of poles each spaced 45 degrees out of phase with its preceding pair with respect to the 16 coded segments of channel 3, the poles of a given pair being spaced 180 degrees from each other. Assuming the pole $A_{31}$ of the first pair of be directly opposite a code segment, its associated pole $A_{32}$ is spaced 180 degrees out of phase with respect to a coded segment. The pole $B_{31}$ of the second pair is then spaced 45 degrees out of phase with pole $A_{31}$ relative to a coded segment or ¼ the width of a coded segment while its associated pole $B_{32}$ is spaced 180 degrees out of phase with respect to the pole $B_{31}$ or 225 degrees relative to its associated its associated coded segment. Similarly, the pole $C_{31}$ of the third pair is spaced 90 degrees or half a coded segment width out of phase with pole $A_{31}$ relative to its associated coded segment while its associated pole $C_{32}$ is spaced 180 degrees out of phase with respect to the pole $C_{31}$ or 270 degrees relative to its associated coded segment. And finally, the pole $D_{31}$ of the fourth pair is spaced 135 degrees or ¾ of a coded segment width while its paired pole $D_{32}$ is spaced 315 degrees relative to its associated coded segment. In that manner the poles of each pair are 180 degrees out of phase with each other relative to coded segments while the four respective pole pairs each 45 degrees out of phase with its preceding pair, all relative to the coded segments of channel 3. As in FIG. 6, the proportions shown are illustrative; in practice the gaps should be made as small as possible.

It should be noted that the corresponding poles in FIG. 2 are not disclosed in the same order as in FIG. 4 for the reason that in FIG. 2 the poles for channel 3 are so placed on the stator 11 as to provide maximum space between poles of adjacent channels. In positioning the poles on the stator 11 for any given channel it is only necessary to insure that the spatial phase relationship between poles of each pair and between the four pairs is provided as illustrated in FIG. 4 and FIG. 6.

The spatial phase relationship between the poles of given channels may be further illustrated by showing the phase relationship of signals which are detected on the coils of the respective poles for all positions of a pole of the fifth channel relative to one binary pair of coded segments. Considering the fifth and sixth channels, as the rotor is rotated relative to the stator one coded segment length of the fifth channel, the poles of the sixth channel are rotated four pole lengths and the signals sensed in the respective coils of the eight poles in the fifth channel and the eight poles in the sixth channels have the phase relationship illustrated. As noted hereinbefore, the signals of a given pair are 180 degrees out of phase with each other so that they may be combined to provide a more discrete signal. Thus the signal derived from the pole $B_{51}$ is combined with the signal derived from the pole $B_{52}$ to provide a signal $B_5$ the phase relationship of which is that of the signal derived from the pole $B_{51}$.

The manner in which signals from the four pairs of poles of each channel are employed to produce an octal code for the least significant channel and two quarternary codes for the remaining more significant channels may be best understood from the following truth table for the least significant channel 6 and the adjacent channel 5.

CHANNELS 5 AND 6 TRUTH TABLE

| $A_{51}$ | $B_{51}$ | $C_{51}$ | $D_{51}$ | $A_{61}$ | $B_{61}$ | $C_{61}$ | $D_{61}$ | $J_{5x}$ | $J_{4x}$ | $J_{5y}$ | $J_{4y}$ | $J_5$ | $J_4$ | $J_3$ | $J_2$ | $J_1$ |
|---|---|---|---|---|---|---|---|---|---|---|---|---|---|---|---|---|
| | | | | | | | | $J_3=1$ | | $J_3=0$ | | | | | | |
| 0 | 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 1 | 0 | 0 | 0 | 0 | 0 | 0 | 1 |
| 0 | 0 | 0 | 1 | 0 | 0 | 1 | 1 | 0 | 0 | 0 | 0 | 0 | 0 | 0 | 1 | 0 |
| 0 | 0 | 0 | 1 | 0 | 1 | 1 | 1 | 0 | 0 | 0 | 0 | 0 | 0 | 0 | 1 | 1 |
| 0 | 0 | 0 | 1 | 1 | 1 | 1 | 1 | 0 | 0 | 0 | 0 | 0 | 0 | 1 | 0 | 0 |
| 0 | 0 | 0 | 1 | 1 | 1 | 1 | 0 | 0 | 0 | 0 | 0 | 0 | 0 | 1 | 0 | 1 |
| 0 | 0 | 1 | 1 | 1 | 1 | 0 | 0 | 0 | 0 | 0 | 1 | 0 | 0 | 1 | 1 | 0 |
| 0 | 0 | 1 | 1 | 1 | 0 | 0 | 0 | 0 | 0 | 0 | 1 | 0 | 0 | 1 | 1 | 1 |
| 0 | 0 | 1 | 1 | 0 | 0 | 0 | 1 | 0 | 0 | 0 | 1 | 0 | 1 | 0 | 0 | 0 |
| 0 | 0 | 1 | 1 | 0 | 0 | 1 | 1 | 0 | 0 | 0 | 1 | 0 | 1 | 0 | 0 | 1 |
| 0 | 1 | 1 | 1 | 0 | 0 | 1 | 1 | 0 | 1 | 0 | 1 | 0 | 1 | 0 | 1 | 0 |
| 0 | 1 | 1 | 1 | 0 | 1 | 1 | 1 | 0 | 1 | 0 | 1 | 0 | 1 | 0 | 1 | 1 |
| 0 | 1 | 1 | 1 | 1 | 1 | 1 | 1 | 0 | 1 | 0 | 1 | 0 | 1 | 1 | 0 | 0 |
| 0 | 1 | 1 | 1 | 1 | 1 | 1 | 0 | 0 | 1 | 0 | 1 | 0 | 1 | 1 | 0 | 1 |
| 1 | 1 | 1 | 1 | 1 | 1 | 0 | 0 | 0 | 1 | 1 | 0 | 0 | 1 | 1 | 1 | 0 |
| 1 | 1 | 1 | 1 | 1 | 0 | 0 | 0 | 0 | 1 | 1 | 0 | 0 | 1 | 1 | 1 | 1 |
| 1 | 1 | 1 | 1 | 0 | 0 | 0 | 0 | 0 | 1 | 1 | 0 | 1 | 0 | 0 | 0 | 0 |
| 1 | 1 | 1 | 1 | 0 | 0 | 0 | 1 | 0 | 1 | 1 | 0 | 1 | 0 | 0 | 0 | 1 |
| 1 | 1 | 1 | 0 | 0 | 0 | 1 | 1 | 1 | 0 | 1 | 0 | 1 | 0 | 0 | 1 | 0 |
| 1 | 1 | 1 | 0 | 0 | 1 | 1 | 1 | 1 | 0 | 1 | 0 | 1 | 0 | 0 | 1 | 1 |
| 1 | 1 | 1 | 0 | 1 | 1 | 1 | 1 | 1 | 0 | 1 | 0 | 1 | 0 | 1 | 0 | 0 |
| 1 | 1 | 1 | 0 | 1 | 1 | 1 | 0 | 1 | 0 | 1 | 0 | 1 | 0 | 1 | 0 | 1 |
| 1 | 1 | 0 | 0 | 1 | 1 | 0 | 0 | 1 | 0 | 1 | 1 | 1 | 0 | 1 | 1 | 0 |
| 1 | 1 | 0 | 0 | 1 | 0 | 0 | 0 | 1 | 0 | 1 | 1 | 1 | 0 | 1 | 1 | 1 |
| 1 | 1 | 0 | 0 | 0 | 0 | 0 | 0 | 1 | 1 | 1 | 1 | 1 | 1 | 0 | 0 | 0 |
| 1 | 1 | 0 | 0 | 0 | 0 | 0 | 1 | 1 | 0 | 1 | 1 | 1 | 1 | 0 | 0 | 1 |
| 1 | 0 | 0 | 0 | 0 | 0 | 1 | 1 | 1 | 1 | 1 | 1 | 1 | 1 | 0 | 1 | 0 |
| 1 | 0 | 0 | 0 | 0 | 1 | 1 | 1 | 1 | 1 | 1 | 1 | 1 | 1 | 0 | 1 | 1 |
| 1 | 0 | 0 | 0 | 1 | 1 | 1 | 1 | 1 | 1 | 1 | 1 | 1 | 1 | 1 | 0 | 0 |
| 1 | 0 | 0 | 0 | 1 | 1 | 1 | 0 | 1 | 1 | 1 | 1 | 1 | 1 | 1 | 0 | 1 |
| 0 | 0 | 0 | 0 | 1 | 1 | 0 | 0 | 1 | 1 | 0 | 0 | 1 | 1 | 1 | 1 | 0 |
| 0 | 0 | 0 | 0 | 1 | 0 | 0 | 0 | 1 | 1 | 0 | 0 | 1 | 1 | 1 | 1 | 1 |

Figure 7:
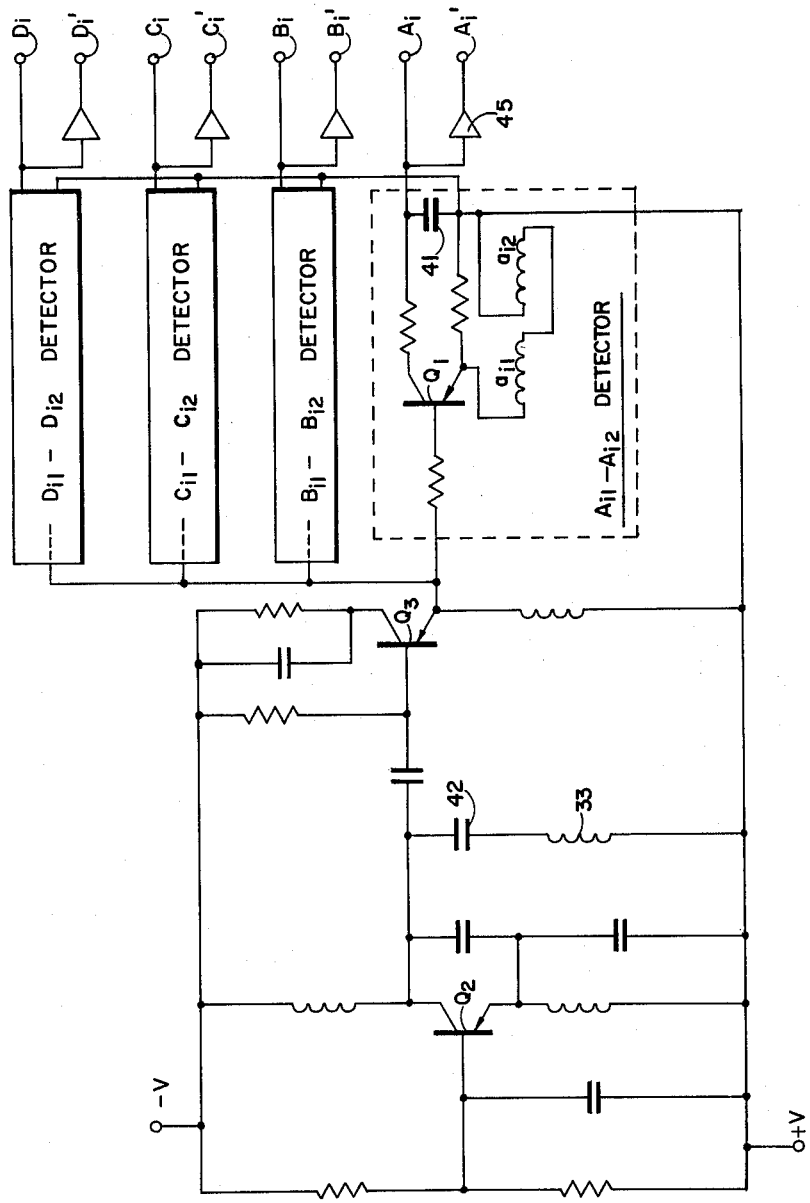
FIG. 7 is a schematic diagram of the electronic circuits provided in the assembly of FIG. 5.

The output detectors provided for a given channel to derive the differential output signals $A_i$, $B_i$, $C_i$ and $D_i$ are illustrated in FIG. 7. The series-opposed coils $a_{i1}$ and $a_{i2}$ are connected in the emitter circuit of a transistor switch $Q_1$ which functions as a synchronous demodulator by being switched on and off at the excitation frequency from the collector of a transistor $Q_2$ in an oscillator coupled to the base of the transistor $Q_1$ by an amplifying transistor $Q_3$. The differentially or subtractively combined signal of each of the sensing coils $a_{i1}$ and $a_{i2}$ is switched through the synchronous transistor switch $Q_1$ to the detector output terminal $A_i$ via a coupling resistor 40. Filtering of the output signal is provided by a capacitor 41 connected between the output terminal $A_i$ and a source of reference potential $+V$. Since the excitation coil 33 wound around the pole 12 of the stator in FIG. 2 is coupled to the collector of the transistor $Q_2$ by a capacitor 42, the operation of the synchronous switch $Q_1$ is in phase with the excitation of the coil 33 thereby providing an output signal having an amplitude which is proportional to the position of the associated poles $a_{i1}$ and $a_{i2}$ relative to the coded segments of the channel $i$. An inverter is connected to each output terminal such as the inverter 45 connected to the output terminal $A_i$ to provide for each output signal $A_i$, $B_i$, $C_i$ and $D_i$ the respective complementary signals $A_i'$, $B_i'$, $C_i'$ and $D_i'$ which are employed to derive the octal and bi-quaternary codes from the respective channels which are in turn employed to derive a 13-bit position code through the logic networks indicated in FIG. 9 in accordance with present invention.

The time output signals from the decoders of a given channel are denoted $A_i$, $B_i$, $C_i$ and $D_i$, as indicated in FIG. 7 and correspond to the signals of position $A_{i1}$, $B_{i1}$, $C_{i1}$ and $D_{i1}$. Accordingly, the foregoing truth table for channels 5 and 6 may be obtained from FIG. 8 by inspection. The truth tables for the remaining channels may be obtained in a similar manner keeping in mind that the cycle of the position signals for each successive more significant channel are four times as long as for its preceding channel.

In the truth table and the logic networks of FIG. 9, $J_i$ represents a binary digit of the binary number $J_{13}J_{12}J_{11}$ ... $J_1$, where $i$ represents the order of significance from the least significant binary digit $J_1$ to the most significant binary digit $J_{13}$. $J_{13}$ and $J_{12}$ are derived from channel 1; $J_{11}$ and $J_{10}$ from channel 2; $J_9$ and $J_8$ from channel 3; $J_7$ and $J_6$ from channel 4; $J_5$ and $J_4$ from channel 5; $J_3$, $J_2$ and $J_1$ from channel 6, all according to the Boolean equations indicated for the logic networks in FIG. 9. The networks themselves may be implemented directly with diode gates in a manner well known in the art and therefore are not shown. The networks may also be implemented with NOR gates or NAND gates, if preferred.

The octal code $J_3J_2J_1$ for the three least significant digits of the 13-bit binary number which represents the position of the rotor 10 (FIG. 5) are derived in a straightforward manner by the logic network 50. The input signals to the network 50 are obtained from the six-channel, binary-coded, magnetic position resolver described with reference to FIGS. 1 to 8 and generally indicated in FIG. 9 as block 51 having a set of output signals $A_i$, $A_i'$; $B_i$, $B_i'$;

$C_1$, $C_1'$; and $D_1$, $D_1'$ for each channel, as more fully described hereinbefore with specific reference to FIG. 7.

The quaternary codes $J_{5x}J_{4x}$ and $J_{5y}$ and $J_{4y}$ of the foregoing truth table are derived according to the following logic equations:

$$J_{4x} = B_5D_5 + B_5'D_5'$$
$$J_{5x} = D_5'$$
$$J_{4y} = A_5C_5' + A_5'C_5$$
$$J_{5y} = A_5$$

To derive the digits $J_4$ and $J_5$ from the biquaternary code $J_{5x}J_{4x}J_{5y}J_{4y}$, the most significant digit $J_3$ derived from the preceding channel is examined. If that digit is 1, a logic network 52 selects the first quaternary code $J_{5x}J_{4x}$ as the digits $J_5J_4$; otherwise, it selects the second quaternary code $J_{5y}J_{4y}$. Since $J_3$ is equal to $A_6$, the term $A_6$ could be used in place of $J_3$ in the logic network 52.

Selection of one of the quaternary codes from each of the remaining channels to derive the remaining more significant digits $J_6$ to $J_{13}$ is accomplished in a similar manner, thereby resolving the carry ambiguity between channels and providing a $2n+1$ binary digit number representative of the rotor position from only $n$ channels of coded segments.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, or different output codes, without departing from those principles. As a further obvious modification, the logic network 52 may be employed to perform the functions of the remaining networks 53, 54, 55 and 56 by sequentially switching it to the respective output terminals $A_1$, $A_1'$ . . . $D_1$, $D_1'$ of the channels 5, 4, 3, 2 and 1, each time selecting the output digits $J_6$, $J_7$; $J_8$, $J_9$; $J_{10}$, $J_{11}$; and $J_{12}$, $J_{13}$ in accordance with the most significant digit derived from the preceding channel and stored in an output register not shown. If all channels are alike, including the channel for the least significant digits, only one logic network is required for the entire system. That may be accomplished in the illustrated embodiment by providing a biquaternary coded channel instead of an octal coded channel for channel 6, or by similarly providing some other code for all channels. The appended claims are therefore intended to cover and embrace any such modifications, within the limits only of the true spirit and scope of the invention.

What is claimed is:

1. An apparatus for converting the position of an object to a binary number, the combination comprising first and second members adapted for relative motion with respect to each other, one of said members being connected to said object, a channel of segments on said first member, said segments being of a given length measured along said channel, and uniformly spaced apart along said channel by a distance equal to said given length, a number $n$ of means A, B, . . . on said second member for sensing said segments and producing binary signals, said means being spaced along said channel relative to said segments to produce a spatial phase relationship of $2/n$ times said length between successive means, and a logic network responsive to said binary signals for producing coded signals uniquely describing $2n$ different positions of a given means relative to given segments.

2. An apparatus as defined in claim 1 wherein the code of said coded signals is a binary code.

3. An apparatus as defined in claim 2 wherein said means are grouped in pairs, the means of each pair being associated in series opposition to provide difference signals representative of one of $n/2$ unique positions.

4. An apparatus for converting the positions of an object to a binary number, the combination comprising first and second members adapted for relative motion with respect to each other, one of said members being connected to said object, a plurality of channels of coded segments on said first member, said segments of a given channel being of a given length measured along said given channel and uniformly spaced apart along said given channel by a distance equal to said given length, said given length being X times the length of a segment in the next channel less significant than said given channel, where X is an abritrary integer, a number $n$ of successive sensing means disposed along each channel for sensing said segments and producing binary signals, where $n$ is an integer equal to 2X, said sensing means of a given channel being spaced relative to said segments to produce a spatial phase relationship of $1/X$ times said length between successive sensing means relative to segments of the associated channel, and logic networks, one for each channel responsive to said binary signals from associated sensors for producing at least two out of phase multi-digit codes in binary form and responsive to the most significant binary digit from the next less significant channel for selecting one of said out of phase multi-digit codes, thereby suppressing carry ambiguities.

5. An apparatus for converting the positions of an object to a binary number, the combination comprising first and second members adapted for relative motion with respect to each other, one of said members being connected to said object, a channel of coded segments on said members, said segments being of a given length and uniformly spaced apart along said channel by a distance equal to said given length, a group of successive sensing means for sensing said segments of said channel and producing binary signals, each 45° out of phase with the signal from the next successive sensing means in terms of position relative to segments of said channel, and a logic network responsive to said binary signals from said group of sensing means for producing a group of binary coded digits representing position of said first member relative to said second member.

6. An apparatus as defined in claim 5 wherein said channel is a first one of a group of successive channels, each successive channel having segments of a greater length and having a separate group of successive sensing means, the combination including a separate logic network for each successive channel responsive to binary signals from its associated group of sensing means for producing two sets of binary coded digits representing binary digits of successively higher significance, the first set of binary digits leading and the second set of binary digits lagging by a count equal to a fourth the range of the binary coded digits from the next preceding channel as the first member is moved relative to the second member a distance equal to the distance from a first edge of one segment to the first edge of the next segment in said preceding channel, and responsive to the most significant digit of the binary coded digits derived from the logic network of the next preceding network to transmit as the correct group of binary coded digits said first set of binary digits if said most significant digit is 0 and said second set of binary digits if said most significant digit is a 1.

7. An apparatus for converting the position of an object to a binary number, the combination comprising first and second members adapted for relative motion with respect to each other, one of said members being connected to said object, a channel of segments on said first member, said segments being of a given length and uniformly spaced apart along said channel by a distance equal to said given length, a first means on said second member for sensing said segments and producing a binary signal A, a second means on said second member for sensing said segments in a predetermined spatial phase relationship with said first means for sensing said segments and producing a binary signal B, said predetermined spatial phase relationship being equal to one quarter of said given length, a third means on said second member for sensing said segments in said predetermined spatial phase relationship with said second means for sensing said segments and producing a binary signal C, a fourth means on said second member for sensing said segments in said predetermined spatial phase relationship with said third means for sensing said segments and producing a binary signal D, and a first logic network responsive to said binary signals A, B, C, and D for producing signals of an octal code $J_{n+2}$ $J_{n+1}$ $J_n$ according to the logic equations $$J_n = AB' + A'B + CD' + C'D$$
$$J_{n+1} = AC' + A'C$$
$$J_{n+2} = A$$

where $n$ is an integer representing a given binary order asigned to the least significant digit of the octal code.

8. In apparatus as defined in claim 7, the combination further comprising a second channel of uniform segments on said first member, said segments being of twice said given length and uniformly spaced along said channel by a distance equal to twice said given length, fifth, sixth, seventh and eighth means for sensing segments of said second channel and for producing binary signals A, B, C and D, respectively, said sixth, seventh and eighth means being in respective quarter, half and three-quarters spatial phase relationship with said fifth means, said spatial phase relationships being determined by reference to the length of a segment of said second channel, and a second logic network responsive to said binary signals A, B, C and D from said fifth, sixth, seventh and eighth sensing means and to said $J_{n+2}$ digit signal of said octal $J_{n+2}$ $J_{n+1}$ $J_n$ for producing a quaternary code $J_{n+4}$ $J_{n+3}$ according to the logic equations $$J_{n+3} = J_{n+2}(BD + B'D') + J'_{n+2}(AC' + A'C)$$
$$J_{n+4} = J_{n+2}D' + J'_{n+2}A$$

where signals A, B, C and D, and complementary signals A', B', C' and D' are derived from said fifth, sixth, seventh and eighth means.

9. In apparatus as defined in claim 8, the combination further comprising a plurality of successive channels, each successive channel being similar to said second channel in construction and purpose except that the segments of each successive channel are of twice the length of the segments of its preceding channel and are uniformly spaced by a distance equal to twice the length of the segments of its preceding channel, and for each successive channel, a logic network for producing a quaternary code in response to binary signals A, B, C and D, derived therefrom and to the most significant digit signal of the quaternary code produced by the logic network of the preceding channel in response to binary signals A, B, C and D derived therefrom.

10. In apparatus for converting the position of an object to a binary number, the combination comprising first and second members adapted for relative motion with respect to each other, one of said members being connected to said object, a channel of segments on said first member, said segments being of a given length and uniformly spaced apart along said channel by a distance equal to said given length, a first means on said second member for sensing said segments and producing a binary signal A, a second means on said second member in half-length spatial phase relationship with said first means relative to said segments for sensing said segments and producing a binary signal C, said half-length spatial phase relationship being equal to a half of said given length, and a first logic network responsive to said binary signals A and C for producing a first quaternary code $J_{n+1}J_n$ according to the logic equations $$J_n = AC' + A'C \text{ and } J_{n+1} = A_n$$

where $n$ is an integer representing a given binary order assigned to the least significant digit of the quaternary code.

11. In apparatus for converting the position of a member to a binary number, the combination as described in claim 10 including a third means on said second member in quarter-length spatial phase relationship with said first means relative to said segments for sensing said segments and producing a binary signal B, said quarter-length spatial phase relationship being equal to a quarter of said given length, a fourth means on said second member in quarter-length spatial phase relationship with said second means relative to said segments for sensing said segments and producing a binary signal D, said quarter-length spatial phase relationship being equal to a quarter of said given length, and a second logic network responsive to said binary signal B and said binary signal D for producing a second quaternary code $J_{n+1}J_n$ according to the logic equations $J_n = BD + B'D''$ and $J_{n+1} = D_n$ where $n$ is an integer representing said given binary order assigned to the least significant digit of the quaternary code.

12. In a position encoder of the coded-segment type having a selected number of binary coded channels in one member, a second member, one of said members being movable with respect to the other, sensing elements in said second member, four sensing elements for each channel so disposed that a set of four separate signals A, B, C and D are derived from each channel, each of the elements of a given channel from which signals B, C and D of a given set are derived being so displaced from the element from which the signal A of said given set is derived as to provide a spatial phase relationship therefrom relative to coded segments of the given channel of 45°, 90° and 135°, respectively, first means responsive to the set of four separate signals A, B, C and D associated with a given channel for discerning two separate pairs of four discrete positions resulting from relative motion between said members a distance equal to the length of a segment in said given channel, and for producing a first quaternary code leading and a second quaternary code lagging the normal binary sequence of numbers representing position, by half the range of said quaternary codes, and means responsive to the most significant binary digit derived from the next least significant channel for selecting as the next two most significant binary digits the first quaternary code if that digit is a zero and for selecting the second quaternary code if that digit is a one.

13. In a position encoder of the coded-segment type having a selected number of binary coded channels in one member, a second member, one of said members being movable with respect to the other, sensing elements in said second member, four sensing elements for each channel so disposed that a set of four separate signals A, B, C and D are derived from each channel, each of the elements of a given channel from which signals B, C and D of a given set are derived being so displaced from the element from which the signal A of said given set is derived as to provide a spatial phase relationship therefrom relative to coded segments of the given channel of 45°, 90° and 135°, respectively, first means responsive to the set of four separate signals A, B, C and D associated with the least significant binary coded channel for discerning eight discrete positions resulting from relative motion between said members a distance equal to the length of a segment in the least significant binary coded channel, and for producing an octal code of three binary digits which constitute the three least significant digits of the position encoder, whereby the quantum of uncertainty in the position code derived from the least significant channel is reduced by a factor of eight, second means responsive to the four separate signals A, B, C and D associated with the next least significant channel for discerning two separate pairs of four discrete positions resulting from relative motion between said members a distance equal to the length of a segment in said next least significant channel, and for producing a first quaternary code leading and a second quaternary code lagging the normal binary sequence of numbers representing position by half the range of said quaternary codes, and means responsive to the most significant binary digit derived from the least significant channel for selecting as the next two most significant binary digits the first quaternary code if that digit is a zero and for selecting the second quaternary code if that digit is a one.

References Cited by the Examiner
UNITED STATES PATENTS

| | | | |
|---|---|---|---|
| 2,938,198 | 5/1960 | Berman | 340—347 |
| 2,938,199 | 5/1960 | Berman | 340—347 |
| 2,942,252 | 6/1960 | Wolff | 340—347 |
| 3,003,145 | 10/1961 | Wolff | 340—347 |
| 3,051,943 | 8/1962 | Simon et al. | 340—347 |

MALCOLM A. MORRISON, *Primary Examiner.*